United States Patent
Ray

(10) Patent No.: US 10,767,390 B2
(45) Date of Patent: Sep. 8, 2020

(54) LOCK ALIGNMENT AND MOUNTING TEMPLATE SYSTEM AND METHOD

(71) Applicant: Cothron's Safe & Lock Inc., Austin, TX (US)

(72) Inventor: John David Ray, Pflugerville, TX (US)

(73) Assignee: Cothron's Safe & Lock Inc.

(*) Notice: Subject to any disclaimer, the term of this patent is extended or adjusted under 35 U.S.C. 154(b) by 224 days.

(21) Appl. No.: 16/045,315

(22) Filed: Jul. 25, 2018

(65) Prior Publication Data
US 2020/0032547 A1 Jan. 30, 2020

(51) Int. Cl.
 *E05B 17/06* (2006.01)
 *B23B 47/28* (2006.01)
 *E05B 9/08* (2006.01)

(52) U.S. Cl.
 CPC ......... *E05B 17/06* (2013.01); *B23B 47/288* (2013.01); *E05B 9/08* (2013.01)

(58) Field of Classification Search
 CPC .................. E05B 17/06; B23B 47/288
 USPC ................ 33/194, 197, 562, 613, 645
 See application file for complete search history.

(56) References Cited

U.S. PATENT DOCUMENTS

| | | | | |
|---|---|---|---|---|
| 537,870 A * | 4/1895 | Thielen et al. | ..... | E05D 11/0009 33/197 |
| 1,063,612 A * | 6/1913 | Silcox | ..... | B25B 27/00 29/271 |
| 1,264,649 A * | 4/1918 | Holt | ..... | E05D 11/0009 33/197 |
| 1,333,996 A * | 3/1920 | Rose | ..... | E05D 11/0009 33/197 |
| 1,577,943 A * | 3/1926 | Woodley | ..... | E05D 11/0009 33/197 |
| 1,680,575 A * | 8/1928 | Starbuck | ..... | E04F 21/003 33/197 |
| 2,733,518 A * | 2/1956 | Pszegon | ..... | E05D 11/0009 33/197 |
| 2,938,554 A * | 5/1960 | Schlage | ..... | B27F 5/12 30/167.1 |
| 3,113,600 A * | 12/1963 | Hillgren | ..... | E05B 17/06 144/70 |
| 3,823,754 A * | 7/1974 | Nix | ..... | B23Q 35/42 144/372 |
| 4,294,567 A * | 10/1981 | Wiggins | ..... | B23B 47/288 408/115 R |
| 4,553,336 A * | 11/1985 | Ponce | ..... | B27F 5/12 144/144.51 |
| 4,715,125 A | 12/1987 | Livick | | |
| 4,813,826 A * | 3/1989 | Riedel | ..... | B27F 5/12 33/197 |

(Continued)

*Primary Examiner* — George B Bennett
(74) *Attorney, Agent, or Firm* — The Law Firm of H. Dale Langley, Jr., P.C.

(57) ABSTRACT

A system for mounting a lock for a door that must have at least one hole to accommodate the lock includes a panel, a pin connected to the panel, and at least one template hole, respectively, for each of the at least one hole, respectively, in the panel positioned relative to the pin and in location required for marking the at least one hole. pin extends substantially perpendicular from a face of the panel and has cross-section of shape of a cylinder cutout of the door. The panel is generally rectangular in shape and has a planar surface on which is connected the pin.

20 Claims, 15 Drawing Sheets

(56) References Cited

U.S. PATENT DOCUMENTS

| | | | | |
|---|---|---|---|---|
| 5,116,170 A * | 5/1992 | Palmer | ................... | B23B 47/28 |
| | | | | 408/115 B |
| 5,118,151 A * | 6/1992 | Nicholas, Jr. | ....... | E05B 15/0245 |
| | | | | 29/437 |
| 5,222,845 A * | 6/1993 | Goldstein | ............. | B23B 47/287 |
| | | | | 408/103 |
| 5,896,760 A * | 4/1999 | Osburn | .................. | B25B 5/109 |
| | | | | 269/219 |
| 5,992,028 A * | 11/1999 | Wing | ..................... | E05D 7/123 |
| | | | | 16/254 |
| 6,029,335 A * | 2/2000 | Hui | ..................... | B25B 27/0035 |
| | | | | 29/271 |
| 6,193,449 B1 * | 2/2001 | Diaz | .................... | B23B 47/287 |
| | | | | 408/115 R |
| 6,824,335 B2 | 11/2004 | Lynch | | |
| 7,003,889 B1 * | 2/2006 | Luciani | .................... | B27F 5/12 |
| | | | | 33/194 |
| 7,246,449 B2 | 7/2007 | Pierson et al. | | |
| 9,376,835 B2 | 6/2016 | Schildwachter | | |
| 10,323,421 B1 * | 6/2019 | Gold | ..................... | E04F 21/003 |
| 2005/0210690 A1 * | 9/2005 | Morton | .................. | E05B 17/06 |
| | | | | 33/194 |
| 2014/0366395 A1 * | 12/2014 | Ward | .................... | E04F 21/003 |
| | | | | 33/613 |
| 2019/0271174 A1 * | 9/2019 | Van Kampen | ...... | E05B 17/2084 |

* cited by examiner

LOCK ALIGNMENT AND MOUNTING TEMPLATE SYSTEM AND METHOD

FIELD OF INVENTION

The invention is generally related to the field of door locks and more particularly relates to templates for accurate alignment and mounting of lock cylinder, screws and other lock features, on a variety of doors and closures.

BACKGROUND

There is a wide variety of door closure hardware, such as locks, latch mechanisms, bolt mechanisms, exit devices, face plates, jamb features, handles, knobs, electronic keypads, card reader pads, key locators, and others. Locks, themselves, vary widely in variety, and include those attached to the face or outer portions of the door (e.g., pad locks, rim latch locks), to locks that are more securely incorporated in the door via mortise (i.e., mortise locks and others). More secure locks, such as mortise locks, typically include a main cylinder, cam, or other mechanical lock device that fits within a mortise, together with associated closures, latches, and bolts. Face plates, handles, knobs, levers, and entry systems of mortise and other locks are often attached to the door or door frame.

Door shapes, configurations and sizes vary widely. Mounting of locks within doors, for example, in door and frame mortises and the like, requires a degree of accuracy for effective operative placement of locking and securing features. The locks often require location of a mortise for housing the lock cylinder, bolt, latch and other closing and locking mechanisms. Screws, pins, plates, indicators and other devices attach the lock securely within the mortise and within the door frame. These screws, pins, plates, indicators and other devices are generally located offset in the door frame in relation to the mortise.

Conventionally, door hardware has been fitted by measuring from the lock cylinder or other mortise and door frame edges. The measurements are made by ruler or similar measurement instrument. Because door shapes, configurations and sizes are so varied, the measurements must often be made against corresponding slopes, angles and edges that may have widely varied configuration. Moreover, measurements must be quite accurate and accuracy is not readily possible when making direct measurements on the door frame. As a consequence, accuracy of alignment is not easily achieved.

It would, therefore, be a significant improvement in the art and technology to provide systems and methods for installing locks in doors of varied shapes, sizes and design.

SUMMARY

An embodiment of the invention is a system for mounting a lock for a door that must have at least one hole to accommodate the lock. The system includes a panel, a pin connected to the panel, and at least one template hole, respectively, for each of the at least one hole, respectively, in the panel positioned relative to the pin and in location required for marking the at least one hole.

Another embodiment of the invention is a method that includes providing a panel, connecting a pin to the panel, and forming template holes in the panel. The template holes are offset from the pin in same correspondence that door holes requied for mounting a lock are offset from a lock chamber formed in the door.

Yet another embodiment of the invention is a method of manufacture. The method of manufacture includes providing a generally rectangular planar panel, the panel of length greater than width across a planar surface of the panel, connecting a dowel pin to the planar surface of the panel, the dowel pin projects from the planar surface generally perpendicularly, and forming template holes in the planar surface of the panel.

BRIEF DESCRIPTION OF THE DRAWINGS

The present invention is illustrated by way of example and not limitation in the accompanying figures, in which like references indicate similar elements, and in which.

DETAILED DESCRIPTION

Figure 1:
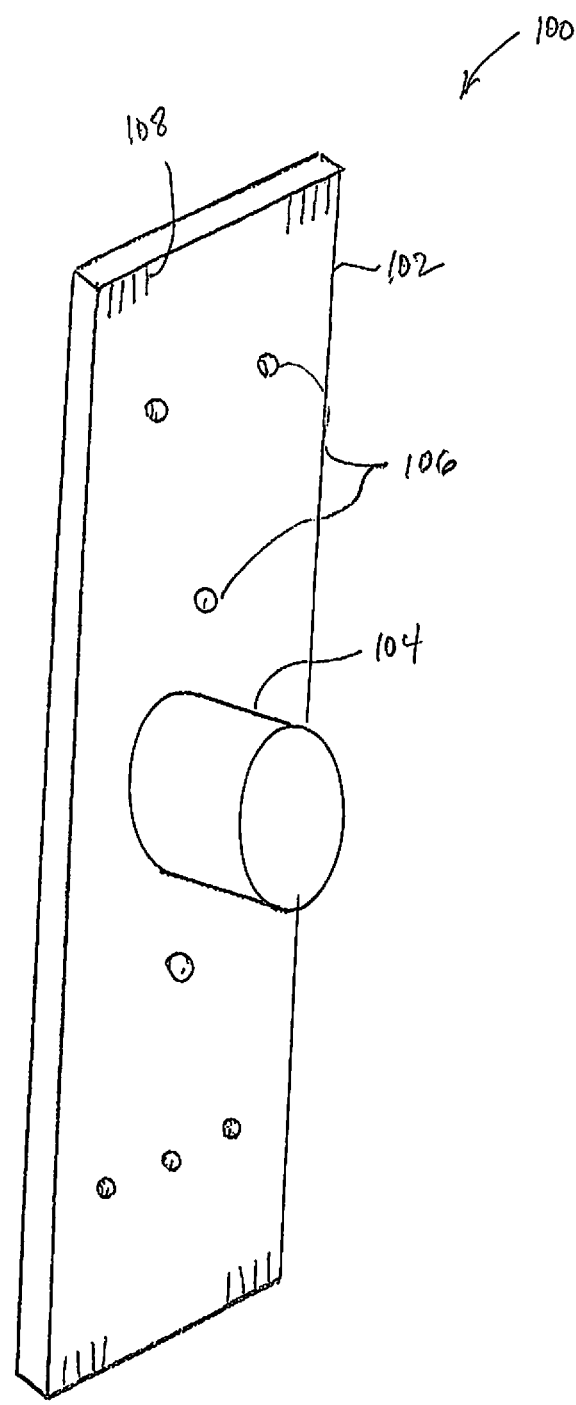
FIG. 1 illustrates a perspective view of a system for mounting a lock for a door, according to certain embodiments.
Figure 2:
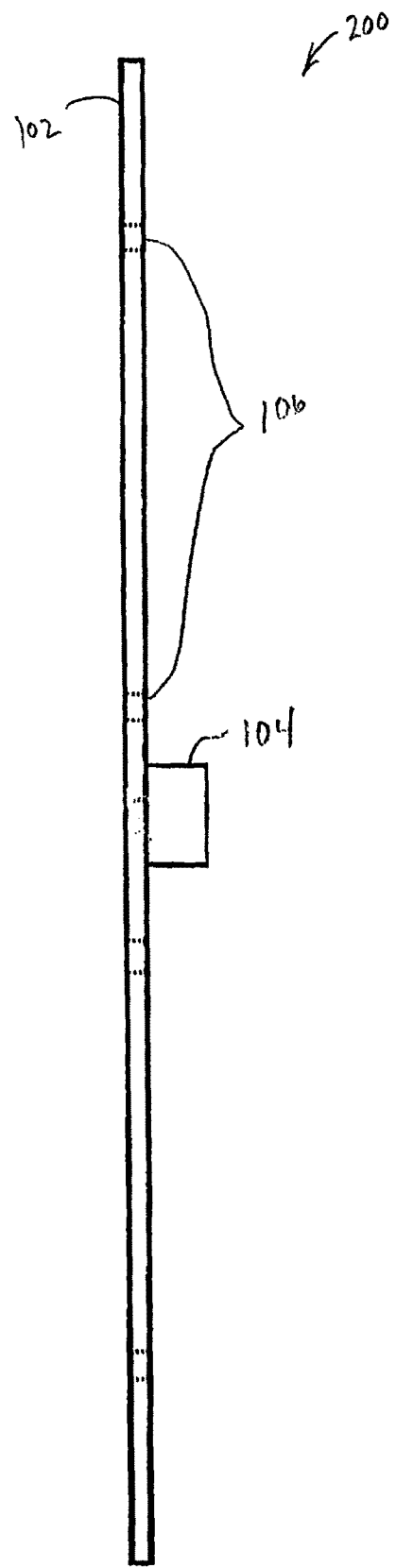
FIG. 2 illustrates a left side view of a system for mounting a lock for a door, according to certain embodiments.
Figure 3:
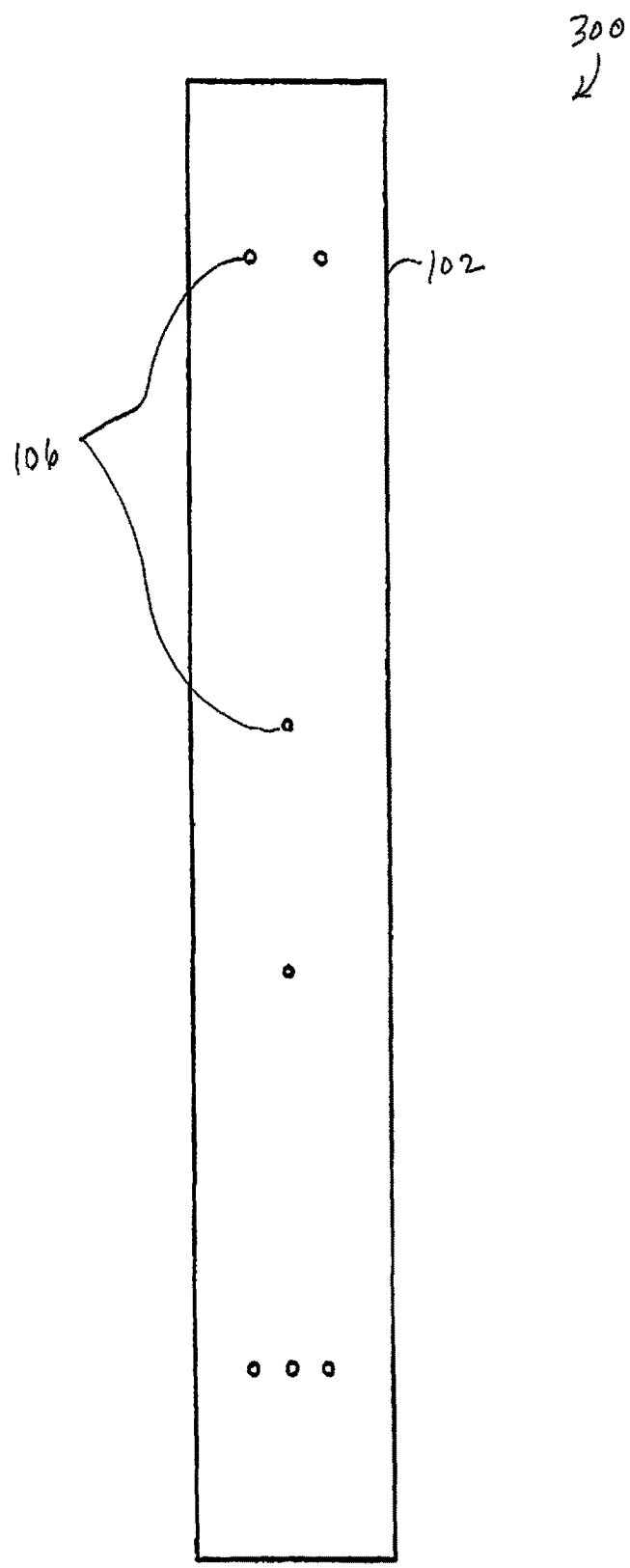
FIG. 3 illustrates a back side view of a system for mounting a lock for a door, as viewed in use in marking the door, according to certain embodiments.

Referring to FIGS. 1-3, in conjunction, a system 100, 200, 300 includes an extended flat panel 102. A dowel pin 104 is connected to the extended flat panel 102 along its extent, for example, about centrally (e.g., mid-length and width) in the panel 102. As so connected, the dowel pin 104 extends perpendicular along its length from the surface of the panel 102.

The extended flat panel 102 is sized to extend from the location of the dowel pin 104 sufficient length to accommodate any template holes 106. The template holes 106 are offset from the dowel pin 104 in the panel 102, for example, for locating various screws, pins, plates, indicators and other devices with respect to the dowel pin 104 (and consequently a cylinder cutout 406 of a lock, shown in FIG. 4). The dowel pin 104 is sized in diameter about slightly smaller than a cylinder cutout (not shown in FIG. 1; shown in FIG. 4 as cylinder cutout 406) in a door for containing a lock.

The template holes 106 are positioned with respect to the dowel pin 104 at locations for screws, pins, brads or other devices for the particular lock corresponding to the system 100, 200, 300. The system 100, 200, 300, for example, may be for an Adams Rite™ lock with corresponding cylinder and securement devices. The periphery of the panel 102 may be formed with indices 108, such as selectively scribed marks. The indices 108 assist in vertical alignment of the panel 102 when the dowel pin 104 is positioned in a cylinder cutout in a door 502 for a lock.

A marker device 602 is employed to mark the door 502 through the template holes 106 that correspond to the lock. The marker device 602 may be, for example, a pen, pencil, punch, scrawl or other device. The marker device 602 must be at least smaller than the template holes 106 in order to pass through the holes 106 sufficient to access the door 502 when the system 600 is in place.

The panel 102 of the system 100, 200, 300 may be formed of metal, plastic, composite or other material. The dowel pin 104 may also be formed of metal, plastic, composite, or other material. The dowel pin 104 may be formed with the formation of the panel 102, for example, such as through molding, or otherwise provided to the panel 102, for example, by welding, adhesive, screw or other fixing device. In nonexclusive embodiments, a hole may be formed in the panel 102 through which the dowel pin 104 may be attached, or the dowel pin 104 may be otherwise attached to a face of the panel 102. The template holes 106 are formed by drilling, molding, or other device, and are located in respect of the dowel pin 104 at measured locations according to the requirements of the lock to be mounted. The indices 108 may be scored, scribed, molded, engraved, printed, stamped or otherwise formed in locations along the periphery of the extending panel 102. The indices are aligned in opposing locations to serve as corresponding vertical indices for locating desired placement for the applicable lock.

Figure 4:
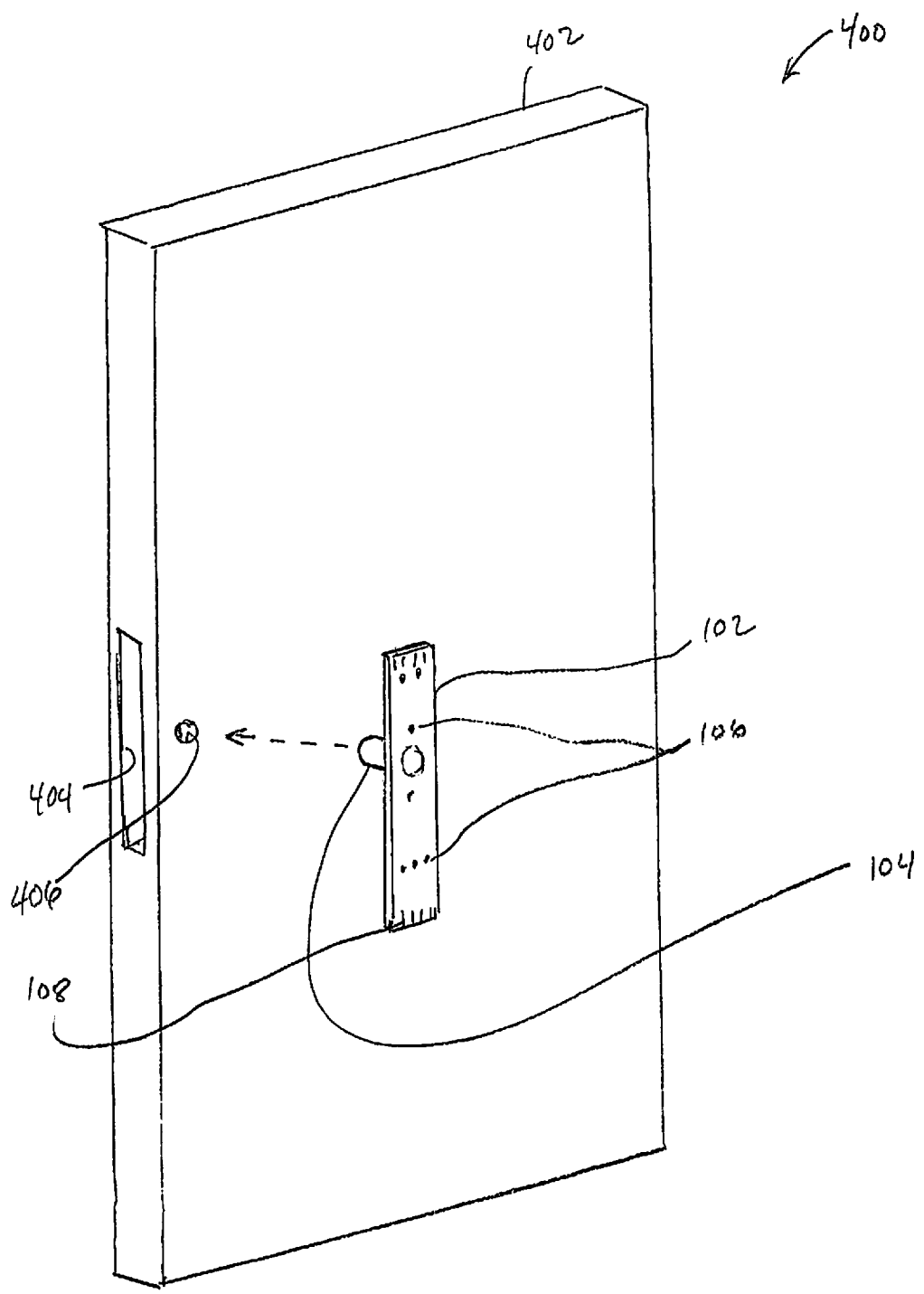
FIG. 4 illustrates a perspective view of a system for mounting a lock for a door, in use to mark the door, according to certain embodiments.

Referring to FIG. 4, a system 400 includes a panel 102 with a protruding dowel pin 104. The panel 102 includes template holes 104 measured relative to the dowel pin 104. The measured locations of the template holes 104 in the panel 102 correspond to holes in a door 402 required to mount a particular lock (not shown) thereon. The particular lock requires screws, brads or other devices to be provided to the door through the lock housing.

In operation, a cylinder cutout 406 is formed in the door 402, for example, by drilling. The cylinder cutout 406 may be positioned, for example, by measurements against the door 402 as may be prescribed for mounting of the lock. A mortise 404 connected to the cylinder cutout 406 is also formed in the door 402, for example, by drilling, chisel, routing, or other. The mortise 404 may be positioned, for example, by measurements against the door 402 and the cylinder cutout 406 as may be prescribed for mounting of the lock.

Upon forming the cylinder cutout 406 and the mortise 404, the dowel pin 104 is inserted into the cylinder chamber 406 formed in the door 402 (or, as applicable, another closure) on which the lock is to be mounted. The panel 102 is then aligned with respect to the door 402 in a desired position for mounting of the lock. The door 402 is marked through the template holes 104, for example, by a pen, punch or other device. Holes of applicable size are then drilled in the door where marked from the template holes 104.

The lock is then mounted in and on the door. The lock mechanisms are fitted within the mortise 404, and the lock cylinder is fitted in the cylinder cutout 406. Facial lock features, such as face plates, are positioned via the holes marked from the template holes 104.

Figure 5:
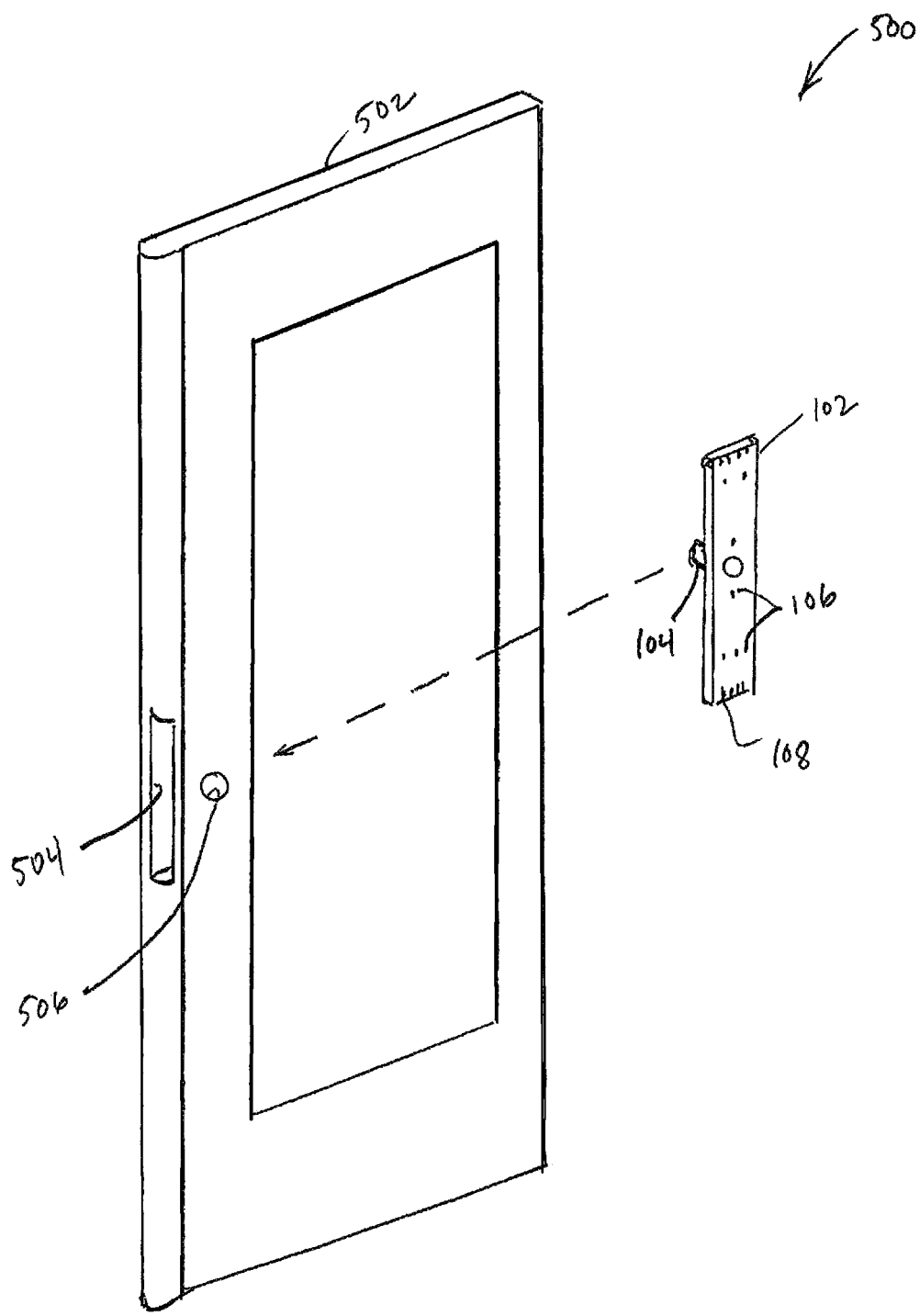
FIG. 5 illustrates a perspective view of a system for mounting a lock for another door, in use to mark the door, according to certain embodiments.

Referring to FIG. 5, a system 500 includes a dowel pin 104 protruding from the surface of a panel 102. The panel 102 extends in length and width, for example, at least approximately about a length and width, respectively, of a lock face of a lock for which the system 500 is employed in mounting. The panel may be longer and wider than the applicable lock face.

The dowel pin 104 is connected to the panel 102 in generally mid- or offset-in relation to the vertically extended portion of the panel 102. For example, the dowel pin 104 may be formed as integral to the panel 102 or added to the panel 102 by attachment. The dowel pin 104 is positioned to allow respective template holes 106 to be formed to correspond to holes in a door 402 required to mount a particular lock (not shown) thereon.

Figure 6:
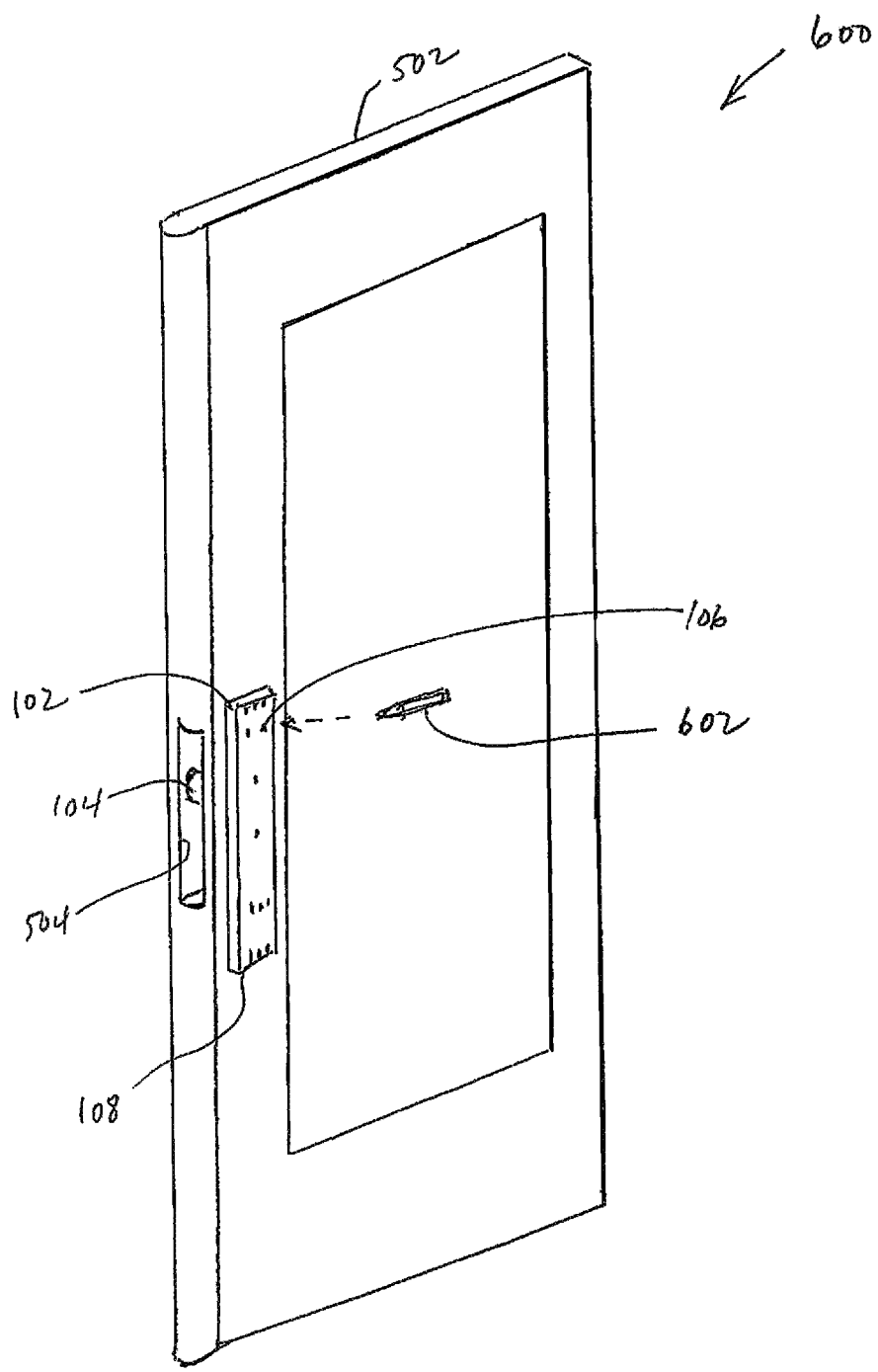
FIG. 6 illustrates a perspective view of a system for mounting a lock for a door, in use, with a pin of the system inserted in a cylinder chamber formed in the door and marking of the door, according to certain embodiments.

Referring to FIG. 6, a system 600 includes the panel 102 with the dowel pin 104 inserted through the cylinder cutout 506 (shown in FIG. 5) of the door 502, in use in mounting a lock on a door 502. The panel 102 includes the template holes 106. The system 600 is placed by inserting the dowel pin 104 into the cylinder cutout 506 previously made in the door 502. The dowel pin 104 is inserted until the panel 102 rests against the door 502. The panel 102 is positioned via the incides 108 in vertical or other desired relationship to the door 502 at a frame of the door 502.

A marker 602, for example, a pen, pencil, punch, scrawl, or other device, is positioned in the template holes 106 applicable for the particular lock being mounted. The door 502 is marked through the template holes 106. The system 600 is then removed from connection to the door 502. A drill, router, or other device is then employed to create holes or other formations in the door 502 for accepting securement devices of the lock.

The lock is then mounted in position in the mortise 504 and cylinder cutout 506 and the outward facing features or trims of the lock are secured to the door 502.

Figure 7:
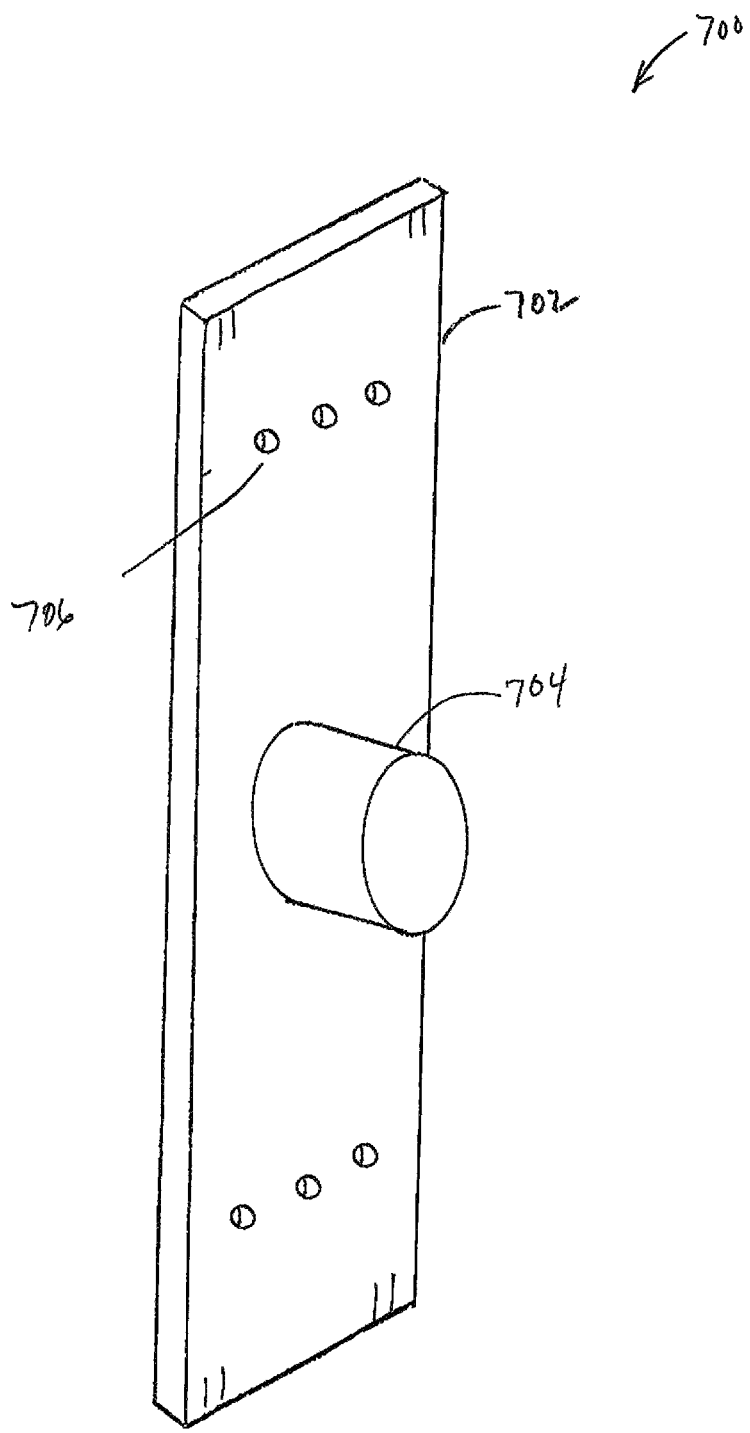
FIG. 7 illustrates a perspective view of another system for mounting a lock for a door, according to certain embodiments.
Figure 8:
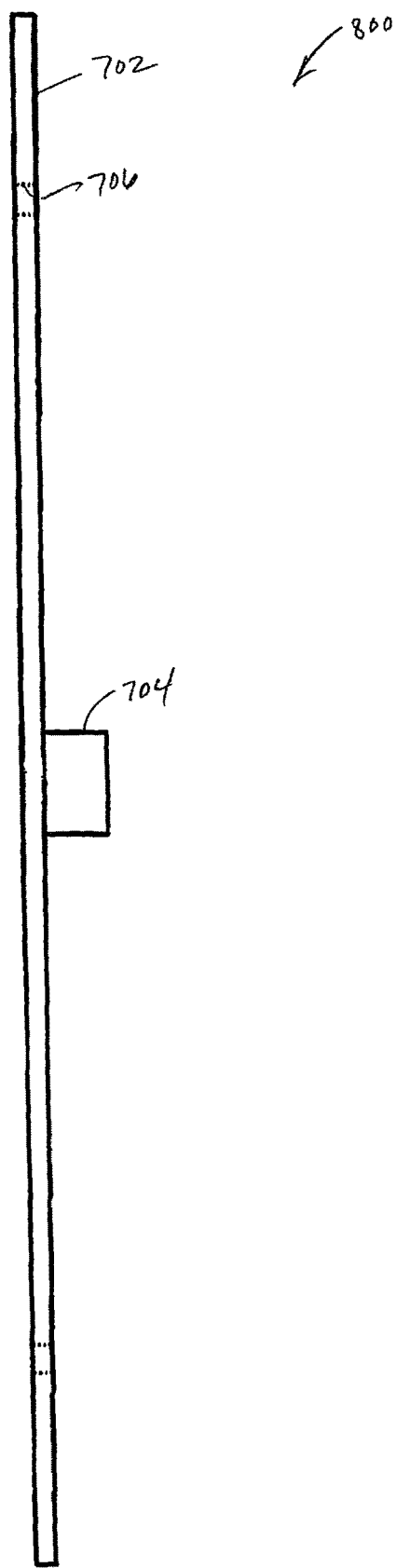
FIG. 8 illustrates a left side view of another system for mounting a lock for a door, according to certain embodiments.
Figure 9:
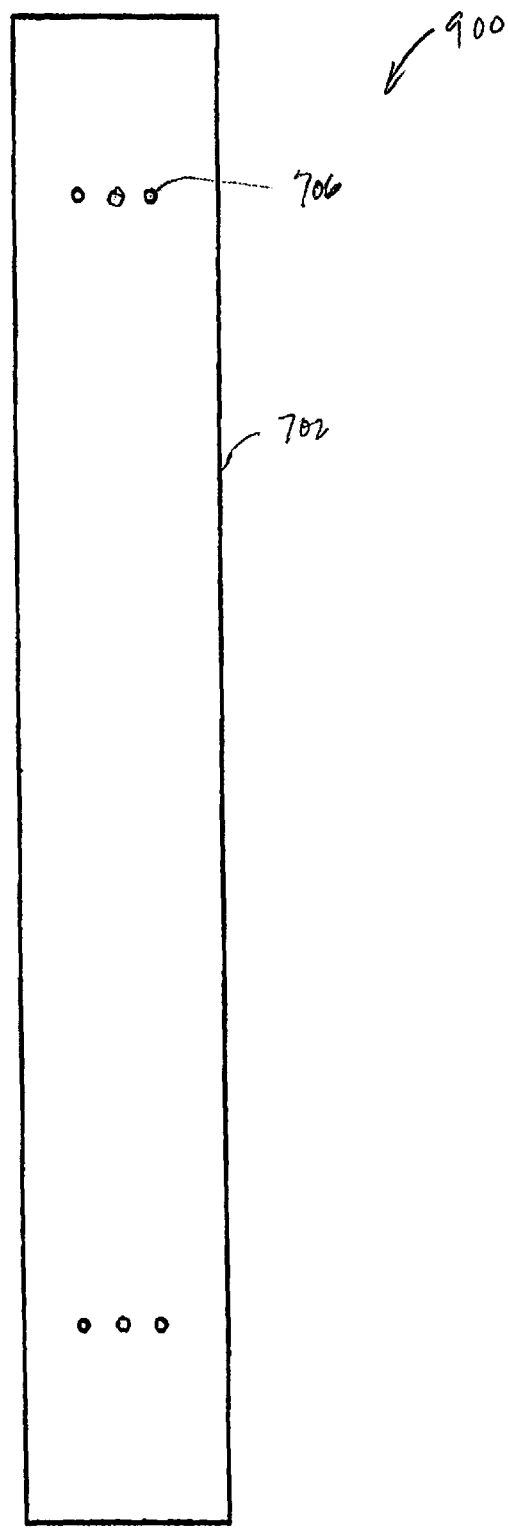
FIG. 9 illustrates a back side view of another system for mounting a lock for a door, according to certain embodiments.

Referring to FIGS. 7-9, in conjunction, a system 700, 800, 900 includes a planar blade 702. A column 704 is generally centrally connected to the blade 702. The blade 702 may, but need not necessarily, be rectangular and extended, and the column 704 may, but need not necessarily, be cylindrical and fairly short (e.g., on the order of 1"-2") extending from the blade 702.

The blade 702 of the system 700, 800, 900 extends of sufficient length and width from the column 704 in order to accommodate template holes 706 at locations for screws, pins, plates, indicators and other devices of a lock (not shown). The column 704 is sized about slightly smaller than a cylinder cutout in a door (not shown) for containing the lock. The blade 702 may, but need not necessarily, be formed with markings 708. If present, the markings 708 can assist in alignment of the panel 102 with respect to the door.

As with the system 100, a marker (not shown), such as a punch, pen, pencil, scrawl or other, is employed to mark the door through the template holes 706 that correspond to the lock.

The blade 702 may be formed of metal, plastic, composite or other material. The column 704 may also be formed of metal, plastic, composite, or other material, and the materials of the blade 702 and the column 704 may be different or same. The template holes 706 are formed by drilling, molding, or otherwise. The markings 708 may be scored, scribed, molded, engraved, printed, stamped or otherwise formed in the blade 702.

In operation, the column 704 is inserted in a cylinder cutout formed in a door. The blade 702 is aligned with the door to position the template holes 706 relative to the door. Once the blade 702 is aligned as desired, a punch, scrawl or other marker is inserted into the template holes 706 and the door is selectively marked to correspond with an applicable lock. The lock requires holes in the door or other features of the door, in order to properly mount the lock on the door. The system 700, 800, 900 is removed from the door after marking. The marks on the door may be drilled or otherwise fitted to allow the lock and any facing features to be secured to the door in desired location and layout.

Figure 10:
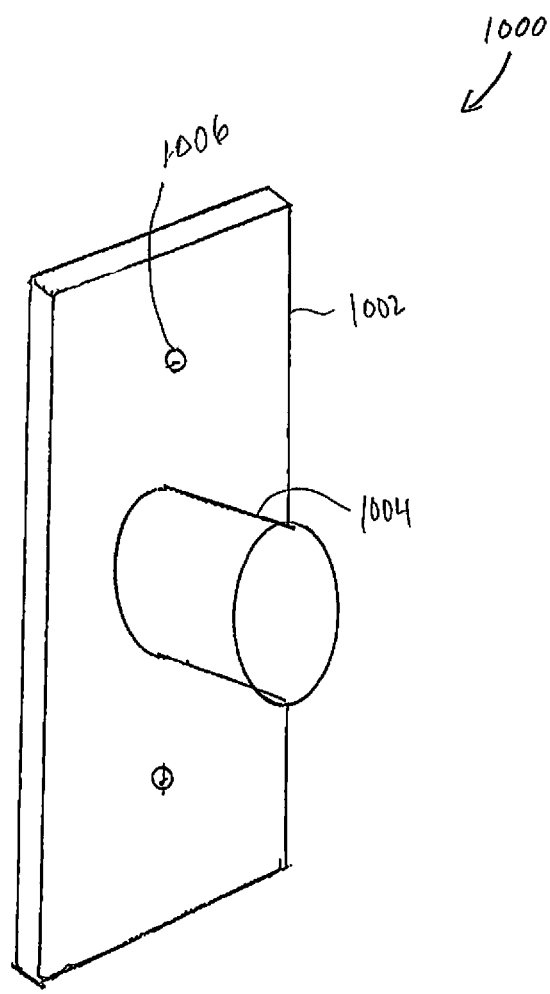
FIG. 10 illustrates a perspective view of a yet another system for mounting a lock for a door, according to certain embodiments.
Figure 11:
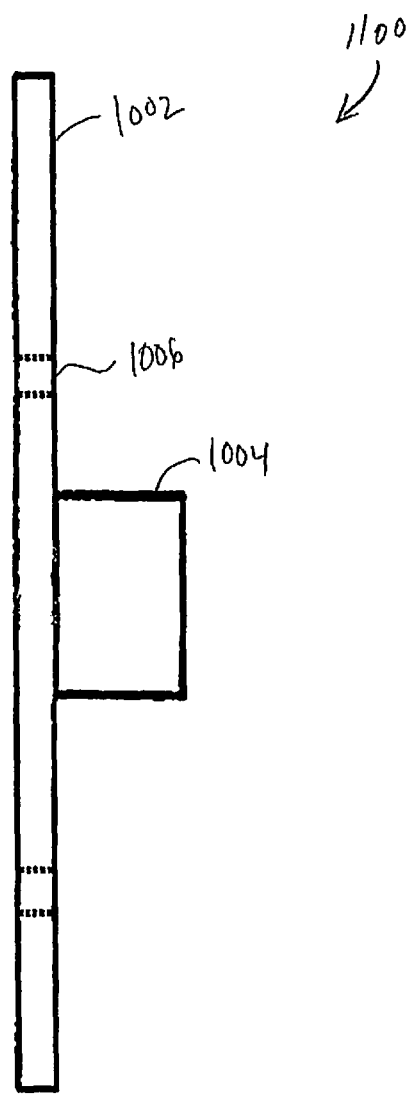
FIG. 11 illustrates a left side view of a yet another system for mounting a lock for a door, according to certain embodiments.
Figure 12:
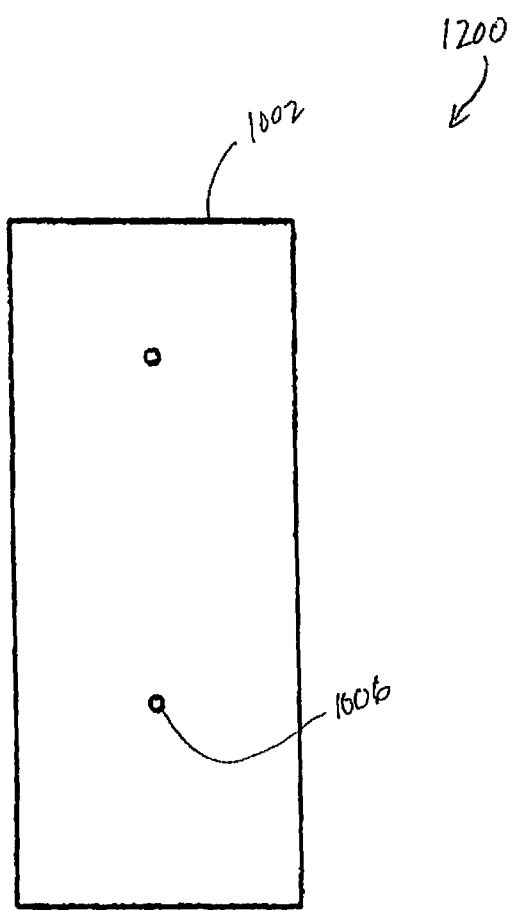
FIG. 12 illustrates a back side view of a yet another system for mounting a lock for a door, according to certain embodiments.

Referring to FIGS. 10, 11 and 12, in conjunction, a system 1000, 1100, 1200 includes a member 1002. The member 1002 is of sufficient length and width to lay out a pattern of lock features, such as screw holes or other fittings, for a particular lock of interest. A pin 1004 is attached to and extends from the extended member 1002. The pin 1004 may be relatively central to the member 1002, or otherwise offset, to allow sufficient space in the member 1002 for holes 1006 corresponding to lock mounting features for a particular lock. The pin 1004 may be sized in cross-section slightly smaller than a desired cylinder cutout formed in a door for the lock, and may project from the member 1002 sufficient to locate within the cylinder cutout with the member flush against the door, such as the door frame. The member 1002 may, but need not necessarily, include indices for alignment purposes.

The member 1002 may be metal, plastic, composite, or other material, and the pin 1004 may be of same or different material. The member 1002 and the pin 1004 may be molded, machined, independently made and connected, formed together, or otherwise. The holes 1006 in the member 1002 may be drilled, molded, or otherwise formed. Any indices may be scored, scribed, molded, engraved, printed, stamped or otherwise formed in the member 1002.

In operation, the member 1002 is aligned so that the pin 1004 is inserted into a cylinder cutout formed in a door. The pin 1004 is inserted to the extent that the member 1002 is flush with the door edge or frame. With the pin 1004 so inserted, the member 1002 is tilted along the pin 1004 as axis, to a desired alignment of the member 1002 and consequently a desired lock of the door. Once the member 1002 blade 702 is aligned, a punch, scrawl, pen, pencil or other marker is inserted in the holes 1006. The door is marked through the holes. The system 1000, 1100, 1200 is then removed from the door, and the door is drilled, routed or otherwise prepared for mounting of the lock according to the alignment provided by the system 1000, 1100, 1200.

Figure 13:
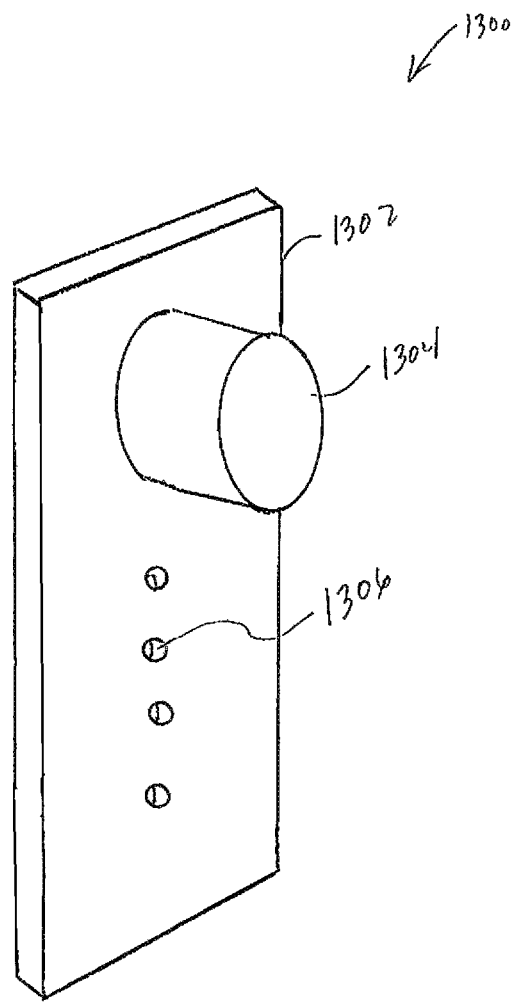
FIG. 13 illustrates a perspective view of an alterantive system for mounting a lock for a door, according to certain embodiments.
Figure 14:
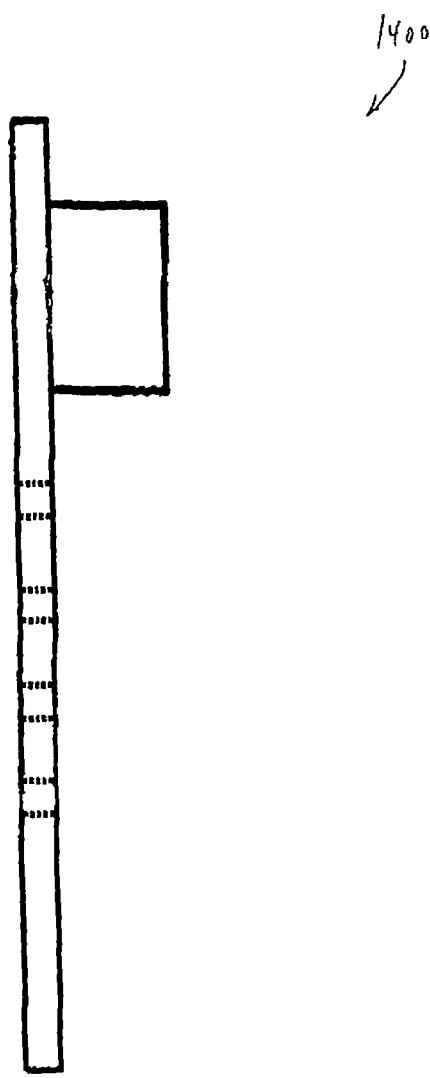
FIG. 14 illustrates a left side view of an alternative system for mounting a lock for a door, according to certain embodiments.
Figure 15:
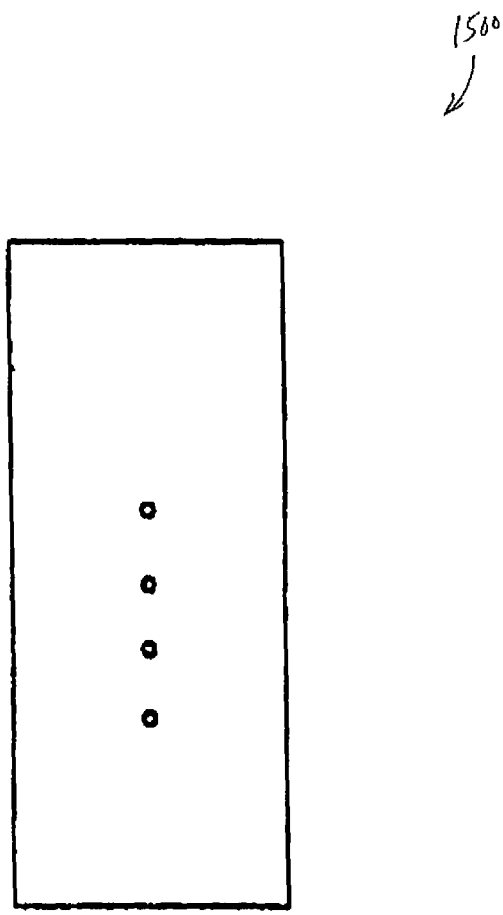
FIG. 15 illustrates a back side view of an alternative system for mounting a lock for a door, according to certain embodiments.

Referring to FIGS. 13, 14 and 15, in conjunction, a pin 1304 is connected to a panel 1302. The pin 1304 is formed with the panel 1302, such as via molding, machining, or otherwise, or else the pin 1304 is attached to the panel 1302 by welding, screw, fastener, gluing, or otherwise. The pin 1304 extends from the panel 1302 a sufficient length to fit within a cutout in a door in which a lock is to be mounted, for example, about 0.05"-2" in length. A cross-section of the pin 1304 is shaped to fit within the cutout, with limited clearance between the pin 1304 and the cutout. The member 1302 includes one or more holes 1306 located relative to the pin 1304 in locations of screws relative to the cutout in the door for mounting a desired lock in the door.

In operation, the pin 1304 is inserted into the cutout in the door, such as a cylinder cutout shape in the door in location desired for the lock. The pin 1304 proceeds within the cutout until the panel 1302 is flush with the door jamb, face, frame, edge, or other surface of the door. The panel 1302 is then aligned with the door edge or feature, in order to align placement of lock features in desired spots in the door. A marker, such as a punch, scrawl, pen, pencil or other, is pushed into the holes 1306 to contact the door and mark the door. The door is drilled, routed, or otherwise impressed in location of lock features. The lock is then mounted on the door via the impression(s).

In the foregoing, the invention has been described with reference to specific embodiments. One of ordinary skill in the art will appreciate, however, that various modifications, substitutions, deletions, and additions can be made without departing from the scope of the invention. Accordingly, the specification and figures are to be regarded in an illustrative rather than a restrictive sense, and all such modifications substitutions, deletions, and additions are intended to be included within the scope of the invention. Any benefits, advantages, or solutions to problems that may have been described above with regard to specific embodiments, as well as step(s), element(s), device(s), and connection(s), that may cause any benefit, advantage, or solution to occur or become more pronounced, are not to be construed as a critical, required, or essential feature or element.

What is claimed is:

1. A system for mounting a lock for a door that must have at least one hole to accommodate the lock, comprising:
    a panel;
    a pin connected to the panel; and
    at least one template hole, respectively, for each of the at least one hole, respectively, in the panel positioned relative to the pin and in location required for marking the at least one hole.

2. The system of claim 1, wherein the pin extends substantially perpendicular from a face of the panel and has cross-section of shape of a cylinder cutout of the door.

3. The system of claim 2, wherein the pin is sized in length sufficient to extend into a cylinder cutout of the door formed for the lock and is shaped in cross-section to extend to slightly smaller than the cylinder cutout.

4. The system of claim 1, wherein the panel is rectangular and extended in length, and the template holes are offset from the pin where connected to the panel in opposing location along the length.

5. The system of claim 2, wherein the pin is generally circular in cross-section and of slightly smaller diameter than the cylinder cutout.

6. The system of claim 3, wherein the pin is generally circular in cross-section and of slightly smaller diameter than the cylinder cutout.

7. The system of claim 1, wherein the panel is rectangular and has length and width sufficient to accommodate template holes located from the pin connection to the panel in relative position of the holes with respect to a cylinder cutout of the door.

8. The system of claim 7, wherein the pin extends substantially perpendicular from a face of the panel and has cross-section of shape of the cylinder cutout of the door.

9. The system of claim 8, wherein the pin is sized in length sufficient to extend into the cylinder cutout of the door formed for the lock and is shaped in cross-section to extend to slightly smaller than the cylinder cutout.

10. The system of claim 9, wherein the pin is generally circular in cross-section and of slightly smaller diameter than the cylinder cutout.

11. A method, comprising:
providing a panel;
connecting a pin to the panel; and
forming template holes in the panel, the template holes are offset from the pin in same correspondence that door holes requied for mounting a lock are offset from a lock chamber formed in the door.

12. The method of claim 11, wherein connecting fixes the pin relatively centrally connected to the panel and projecting from the panel generally perpendicular to a planar surface of the panel.

13. The method of claim 12, wherein forming locates the template holes relative to the pin in the planar surface of the panel.

14. The method of claim 13, wherein the pin has length of about 0.05" to about 2" and is generally circular in cross-section of diameter of slightly less than the lock chamber.

15. The method of claim 11, further comprising:
inserting the pin into a lock chamber formed in a door;
aligning the panel with an edge of the door; and
marking the door with a marker through the template holes.

16. The method of claim 15, further comprising:
drilling the door in location of marks from marking.

17. A method of manufacture, comprising:
providing a generally rectangular planar panel, the panel of length greater than width across a planar surface of the panel;
connecting a dowel pin to the planar surface of the panel, the dowel pin projects from the planar surface generally perpendicularly; and
forming template holes in the planar surface of the panel.

18. The method of claim 17, wherein the template holes are offset from the dowel pin in same correspondence that door holes required for mounting a lock are offset from a lock chamber formed in a door.

19. The method of claim 17, wherein connecting is selected from the group consisting of: molding, welding, gluing, screwing and combinations of these.

20. The method of claim 17, wherein forming is selected from the group consisting of: drilling, routing, molding, pressing, and combinations of these.

\* \* \* \* \*